United States Patent [19]

Ito

[11] Patent Number: 5,026,024
[45] Date of Patent: Jun. 25, 1991

[54] HOSE SNAP-ACTION JOINT

[75] Inventor: Hisayuki Ito, Mie, Japan

[73] Assignee: Tokai Rubber Industries, Ltd., Komaki, Japan

[21] Appl. No.: 420,875

[22] Filed: Oct. 13, 1989

[30] Foreign Application Priority Data

Oct. 14, 1988 [JP] Japan ................... 63-259969

[51] Int. Cl.$^5$ .......................................... F16L 37/28
[52] U.S. Cl. ................................ 251/149.5; 285/86; 285/377
[58] Field of Search ................. 285/377, 86, 362; 251/149.5

[56] References Cited

U.S. PATENT DOCUMENTS

| | | | |
|---|---|---|---|
| 1,673,338 | 6/1928 | Mitchell | 285/86 |
| 2,129,704 | 9/1938 | Meyer | 285/377 |
| 3,537,730 | 11/1970 | Kresin | 285/86 |
| 3,583,667 | 6/1971 | Amneus | 251/149.5 |
| 3,700,269 | 10/1972 | Salata | 285/78 |

FOREIGN PATENT DOCUMENTS

| | | |
|---|---|---|
| 56281 | 6/1983 | Japan . |
| 817977 | 1/1958 | United Kingdom . |
| 961819 | 4/1963 | United Kingdom . |
| 1108020 | 3/1968 | United Kingdom . |
| 1360732 | 11/1972 | United Kingdom . |
| 1411403 | 10/1975 | United Kingdom . |

*Primary Examiner*—A. Michael Chambers
*Attorney, Agent, or Firm*—Berman, Aisenberg & Platt

[57] ABSTRACT

A hose snap-action joint includes a cylinder member comprising an arc-shaped inwardly-directing engaging portion disposed on the inner surface thereof projecting in the radial direction inwardly; an insert pipe member; an engaging member comprising an arc-shaped outwardly-directing engaging portion projecting in the radial direction thereof outwardly, and the outwardly-directing engaging portion made engageable with the inwardly-directing engaging portion at a predetermined angle position by the engaging surface thereof facing in the direction perpendicular to the axial direction thereof; a locking ring disposed in a manner rotatable integrally with the engaging member and relatively movable in the axial direction thereof by a predetermined distance; a spring for urging the locking ring to the cylinder member; and a locking mechanism comprising a locking groove formed on the cylinder member and a locking portion formed on the locking ring. When the locking ring is pressed into the cylinder member by the spring and the locking ring and the engaging member are turned by a predetermined angle, the locking mechanism prohibits the locking ring and the engaging member from turning and the inwardly-directing engaging portion and the outwardly-directing engaging portion engage with each other, thereby connecting the hose with the mating member. The hose and the mating member cannot be disconnected accidentally. The device may be made of plastic.

10 Claims, 8 Drawing Sheets

HOSE SNAP-ACTION JOINT

BACKGROUND OF THE INVENTION

1. Field of the Invention

This invention relates to a hose snap-action joint.

2. Description of the Prior Art

When connecting hoses or connecting a hose with a connection opening of a manifold, a hose snap-action joint is employed.

Figure 10:
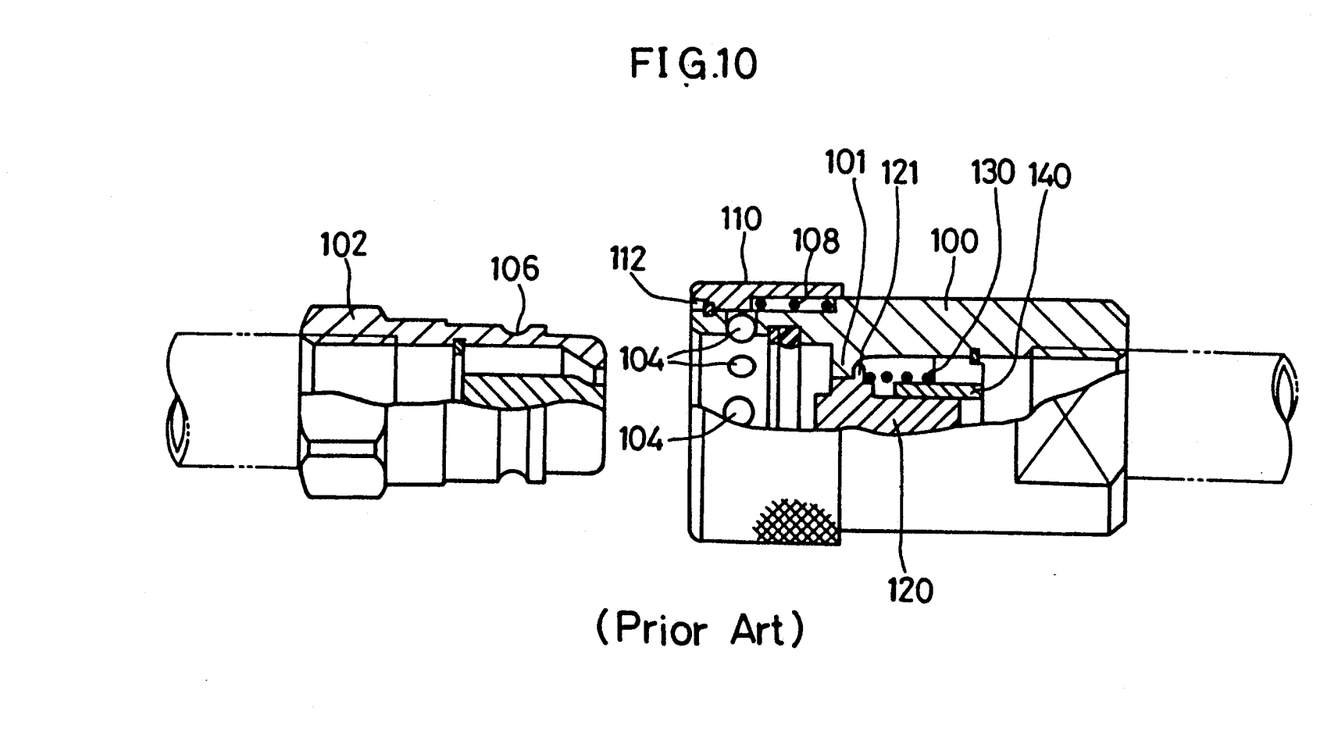
FIG. 10 is a front view, partly in section, of a conventional hose snap-action joint.

Many conventional hose snap-action joints have been known, one of which is disclosed in Japanese Unexamined Utility Model Publication (KOKAI) No. 56281/1983. As shown in FIG. 10, the conventional hose snap-action joint comprises a pair of cylinder-shaped joint fixtures 100 and 102. The joint fixtures 100 and 102 are engaged with each other, thereby connecting hoses. One of the joint fixtures 100 is provided with a plurality of balls 104 projectable in the radial direction, and the other joint fixture 102 is provided with an annular groove 106 for admitting the balls 104. The joint fixtures 100 and 102 are engaged in the axial direction by way of the balls 104 and the annular groove 106, thereby connecting the joint fixtures 100 and 102. When disconnecting the joint fixtures 100 and 102, the balls 104 are recessed in a groove 112 formed on the inner surface of a ring 110 by retracting the ring 110, urged by a spring 108, in the axial direction. The joint fixtures 100 and 102 are thus disconnected.

However, in the hose snap-action joint of this type, all of the components including the pair of joint fixutres 100 and 102 should be made of metal in order to make the locking and unlocking mechanism comprising the balls 104 and the annular groove 106 smoothly operable. Thus, the entire joint fixtures 100 and 102 which have complicated shapes should be machined, and the manufacturing cost becomes expensive, because the total number of the assembly steps, including the assembly of the balls 104, has increased.

Further, in the structure of the hose snap-action joint of this type, the pair of joint fixtures 100 and 102 are prevented from coming-off by the engagement between the balls 104 and the annular groove 106. Accordingly, stress is exerted concentratedly on the engaging positions of the balls 104 and the annular groove 106.

Furthermore, the pair of joint fixtures 100 and 102 allows an easy connecting operation. However, the joint fixtures 100 and 102 are disconnected with ease when the ring 110 is operated by accident.

In addition, when the conventional hose snap-action joint is used in the outdoors, the problem of corrosion always associate with the conventional hose snap-action joint because all of the joint component members are made of metal.

By the way, the hose snap-action joint of the above-mentioned metal-made ball joint type has been applied to a joint for a high pressure hose of 140 kgf/cm² or more. However, in the conventional application, the hose snap-action joint has been applied also to a joint for a relatively lower pressure of 70 to 100 kgf/cm² as it is. In this case, however, the application of the hose snap-action joint, adapted to the high pressure hose application, to the lower pressure hose results in an excessive quality and an expensive manufacturing cost, thereby incurring losses.

SUMMARY OF THE INVENTION

This invention has been developed in order to solve the above-mentioned problems.

A hose snap-action joint according to this invention comprises: a cylinder member formed in a cylinder shape, disposed integrally with or independently of a mating member to be connected, and comprising arc-shaped inwardly-directing engaging portion disposed on the inner surface thereof in a manner projecting in the radial direction thereof inwardly; an insert pipe member, to be fixed at one end of a hose and inserted into the cylinder member, for communicating the mating member and the hose; an engaging member disposed integrally with or independently of the insert pipe member on the outer surface thereof in a manner unmovable in the axial direction thereof with respect to the insert pipe member at least by a predetermined distance or more and comprising arc-shaped outwardly-directing engaging portion, corresponding to the inwardly-directing engaging portion, projecting in the radial direction thereof outwardly, and the outwardly-directing engaging portion made engagable with the inwardly-directing engaging portion at a predetermined angle position by the engaging surface thereof facing in the direction perpendicular to the axial direction thereof; a locking ring disposed in a manner rotatable integrally with the engaging member and relatively movable in the axial direction thereof by a predetermined distance; a spring means for urging the locking ring to the cylinder member in the axial direction thereof; and a locking mechanism comprising a locking groove formed on one of the cylinder member and the locking ring and a locking portion formed on the other one of the cylinder member and the locking ring, and the locking mechanism prohibiting the locking ring and the engaging member from turning by engaging the locking groove and the locking portion when the locking ring is pressed into the cylinder member by the spring means at the predetermined angle position, at which the inwardly-directing engaging portion and the outwardly-directing engaging portion engage with each other.

In the hose snap-action joint according to this invention, when the insert pipe member fixed at one end of the hose is inserted into the cylinder member, which is formed integrally with or fixed on the mating member, and when both of the engaging member and the locking ring are retracted in the axial direction against the urging force of the spring means and the both of them are turned by a predetermined angle, the engaging surface of the inwardly-directing engaging portion of the cylinder member and the engaging surface of the outwardly-directing engaging portion of the engaging member engage each other in the direction perpendicular to the axial direction. At the same time, the locking groove and the locking portion formed respectively on the cylinder member and the locking ring engage, thereby prohibiting the cylinder member and the locking ring from turning. At this moment, the cylinder member and the locking ring are locked at an engaging position. As a result, the hose and the mating member are connected inseparably.

When disengaging the connection, the locking ring is again retracted in the axial direction against the urging force of the spring means in order to disengage the engagement between the locking groove and the locking member, and then both the engaging member and the locking ring are turned by a predetermined angle in the reverse direction to disconnect. In this way, the engagement between the inwardly-directing engaging portion and the outwardly-directing engaging portion completely disengages at a predetermined angle position. At this moment, the insert pipe member fixed to the hose can be removed from the cylinder member.

Thus, the hose snap-action joint according to this invention allows the cylinder member and the engaging member comprising the insert pipe member to engage in the axial direction by way of the inwardly-directing engaging member and the outwardly-directing engaging member, and allows the locking groove and the locking portion formed respectively on the cylinder member and the engaging member to engage. Whereby the cylinder member and the engaging member are locked at the engaging position.

Namely, unlike the conventional hose snap-action joint shown in FIG. 10, the hose snap-action joint according to this invention does not employ balls as a means for engaging and locking the joint component members. Accordingly, the entire joint may be made of plastic. When such is the case, the joint component members of complicated shapes can be molded with ease, and processing costs can be reduced.

In addition, in the hose snap-action joint according to this invention, the engaging surface, facing in the direction perpendicular to the axial direction, of the inwardly-directing engaging member and the engaging surface, facing in the direction perpendicular to the axial direction, of the outwardly-directing engaging member are engaged. Consequently, stress is not exerted on the engaging portions as concentratedly as it does in the conventional engagement by the balls and groove, and the stress or engaging force is thus dispersed in the entire engaging surfaces. Therefore, the hose and the mating member can be connected stably.

Further, in the hose snap-action joint according to this invention, the engagement cannot be disengaged until the locking ring has been retracted against the urging force of the spring means and the locking ring has been turned by a predetermined angle. Thus, there is no fear disconnecting the hose and the mating member by accident.

Furthermore, since the hose snap-action joint according to this invention may be made of plastic as described above, the hose snap-action joint allows the advantages of avoiding the corrosion problems even in the outdoor application.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

FIG. 7 (A) is a side view of an engaging ring i.e., an engaging member, of the hose snap-action joint illustrated in FIGS. 1, 2 and 5;

FIG. 7 (B) is a front view, partly in section, of the engaging ring thereof;

FIG. 8 (A) is a side view of a locking ring of the hose snap-action joint illustrated in FIGS. 1, 2 and 5;

FIG. 8 (B) is a front view, partly in section, of the locking ring thereof;

FIG. 8 (C) is another front view, partly in section, of the locking ring thereof;

FIG. 9 (A) is an explanatory cross-sectional view of the hose snap-action joint for explaining the connection sequence thereof;

FIG. 9 (B) is another explanatory cross-sectional view of the hose snap-action joint for explaining the connection sequence thereof;

FIG. 9 (C) is still another explanatory cross-sectional view of the hose snap-action joint for explaining the connection sequence thereof.

DESCRIPTION OF THE PREFERRED EMBODIMENT OF THE INVENTION

Having generally described this invention, a further understanding can be obtained by reference to a certain specific preferred embodiment which is provided herein for purposes of illustration only and is not intended to be limiting unless otherwise specified.

A preferred embodiment of this invention will be hereinafter described with reference to the drawings.

Figure 1:
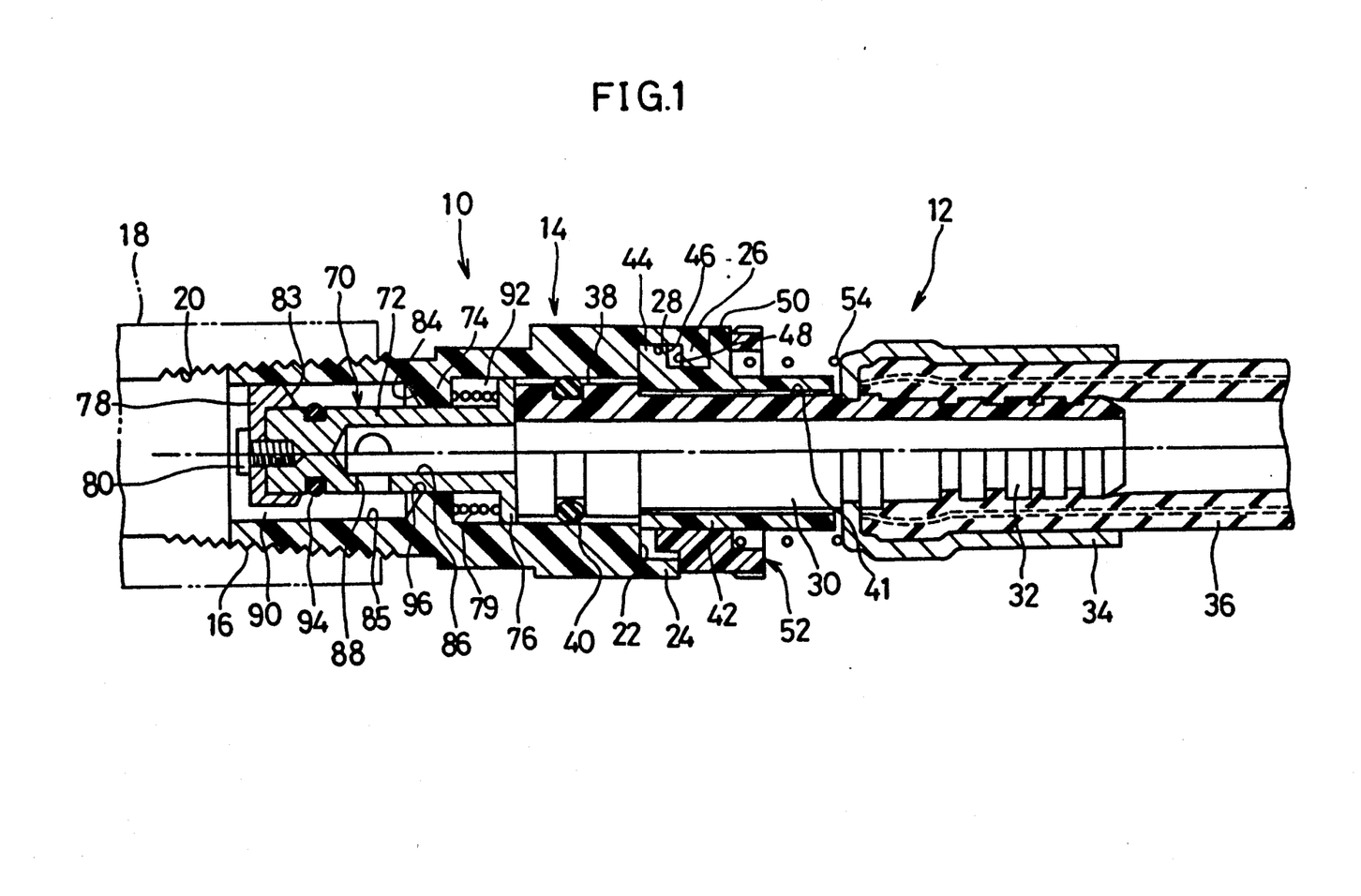
FIG. 1 is a cross-sectional view of a hose snap-action joint of a preferred embodiment according to this invention.

As shown in FIG. 1, a first joint member and a second joint member are designated at 10 and 12 respectively. The first joint member 10 comprises a cylinder member 14 made of polyamide resin. A taper male thread 16 is formed on the outer surface of the cylinder member 14 at the reduced diameter end. The taper male thread 16 is connected to a taper female thread 20 formed on the connection opening of a mating member 18, for instance a water supply manifold and the like, while interposed by a sealing member (not shown).

Figure 6:
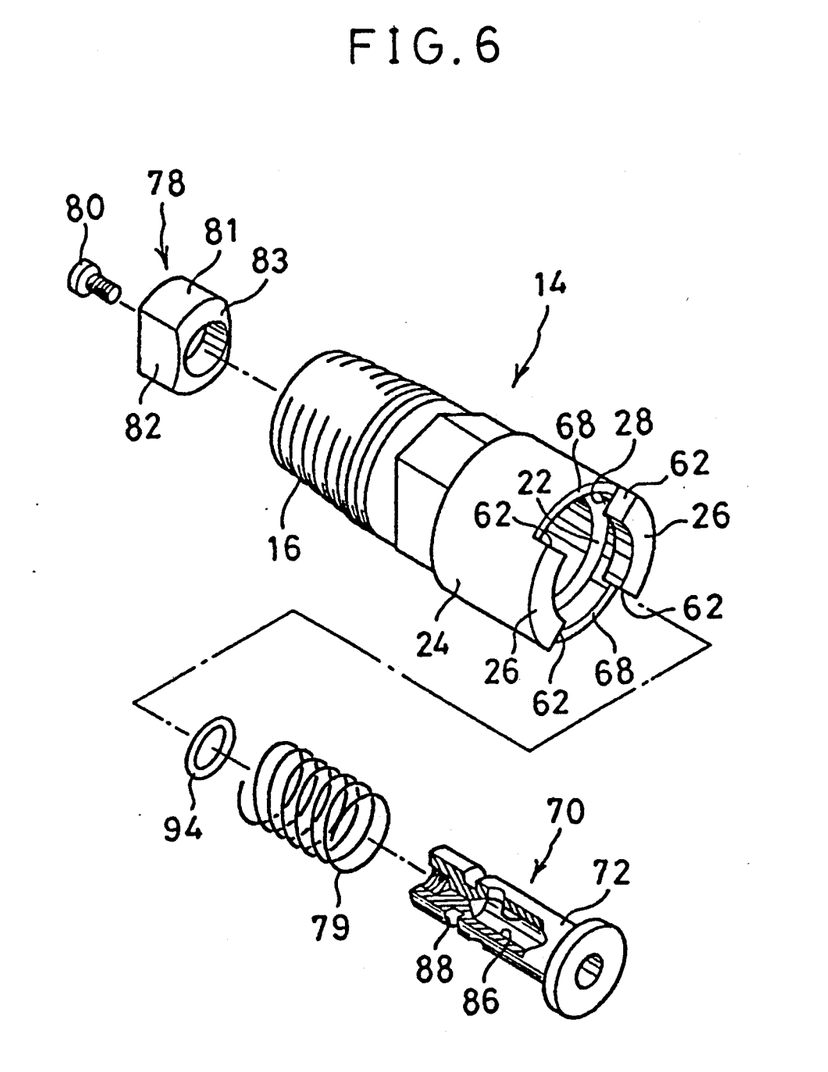
FIG. 6 is an exploded perspective view of the other joint member thereof and the opening-closing valve incorporated therein.
Figure 7A:
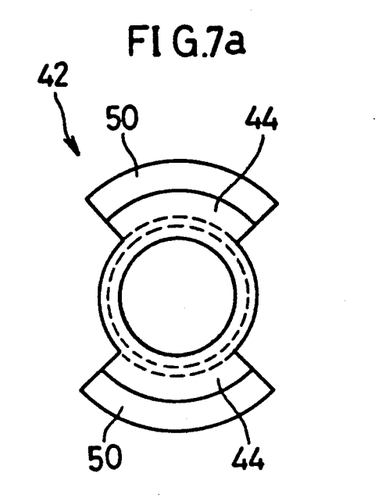
Figure 7B:
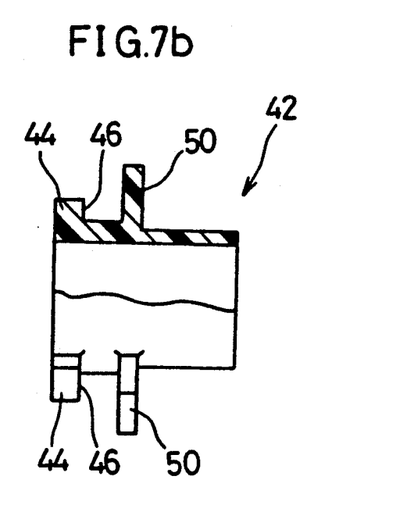

A stepped surface 22 and a periphery wall portion 24 are formed at the increased diameter end of the cylinder member 14, and, as shown in FIG. 6, a pair of arc-shaped inwardly-directing portions 26 projecting in the radial direction thereof inwardly is further formed at the end of the periphery wall portion 24. A pair of arc-shaped grooves 28 are further formed between the inwardly-directing engaging portions 26 and the stepped surface 22.

The second joint member 12 comprises an insert pipe member 30 made of polyamide resin and of a hollow cylinder shape. A convexed-concaved portion 32 are formed at one end of the insert pipe member 30. The convexed-concaved portion 32 and a socket fixture 34 made of aluminum hold the end of a hose 36, thereby fixing the insert pipe member 30 to the hose 36. A head portion 38 is formed at the other end of the insert pipe member 30, and adapted to engage with the inner surface of the cylinder member 14 in a water-proof manner by way of an O-ring 40 installed therearound.

Around the outer wall of the insert pipe member 30, an engaging ring 42, i.e., an engaging member, made of polyamide resin is installed around a convexed portion 41 formed between the head portion 38 and the socket fixture 34. The engaging ring 42 is installed around the convexed portion 41 rotatably but in a manner relatively unmovable in the axial direction with respect to the insert pipe member 30. As detailed in FIGS. 5 and 7, a pair of arc-shaped outwardly-directing engaging portions 44 are formed at one end of the engaging ring 42. Engaging surfaces 46 (shown in FIGS. 1 and 7), facing in the direction perpendicular to the axial direction, of the outwardly-directing engaging portions 44 are adapted to engage with engaging surfaces 48 (shown in FIGS. 1 and 3), facing in the direction perpendicular to the axial direction, of the inwardly-directing engaging portions 26. In addition, a pair of guide-stopper portions 50 is formed at an intermediate position of the engaging ring 42 in the axial direction.

Figure 5:
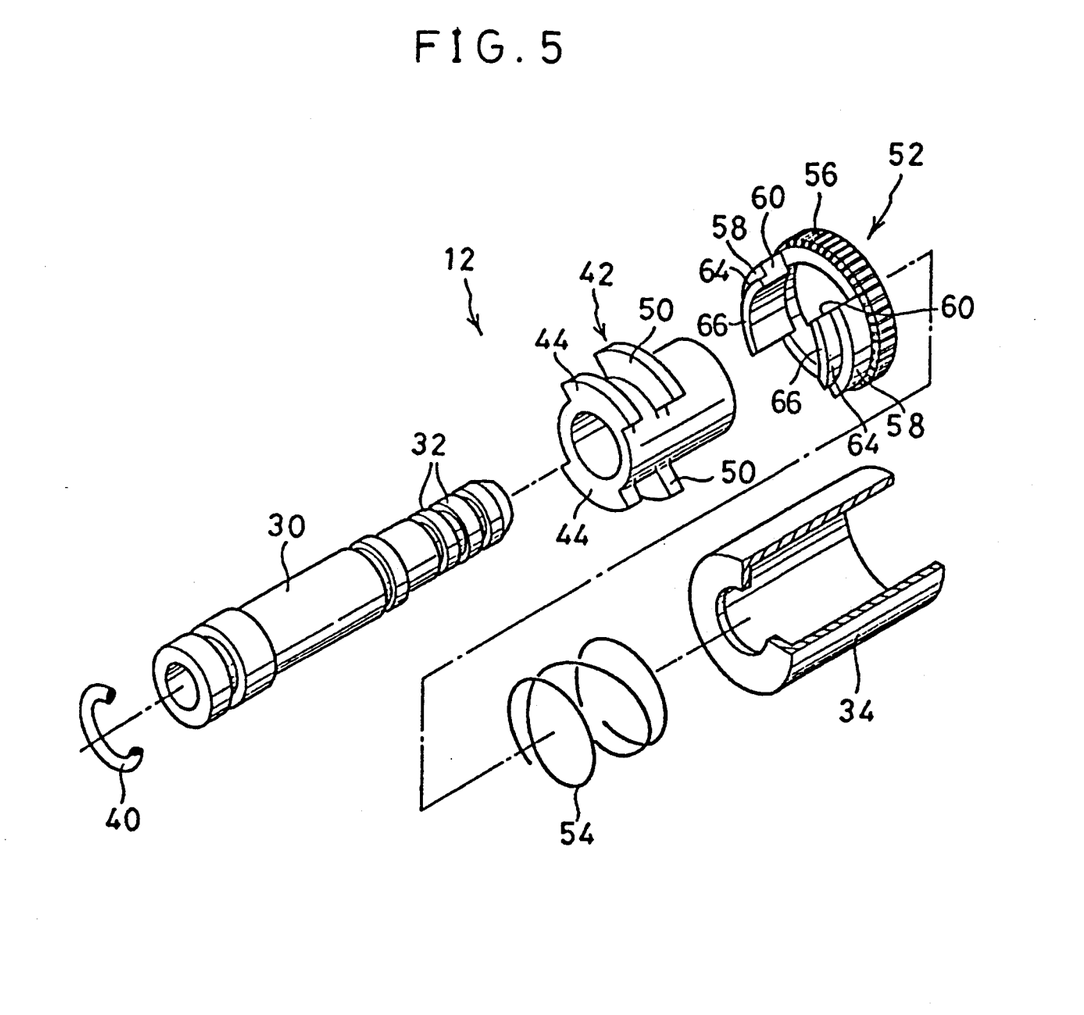
FIG. 5 is an exploded perspective view of a joint member of the hose snap-action joint.
Figure 8A:
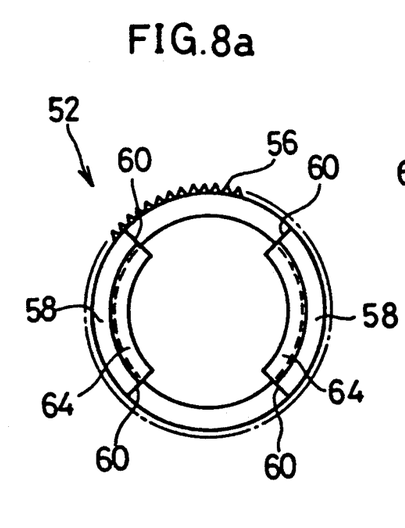
Figure 8B:
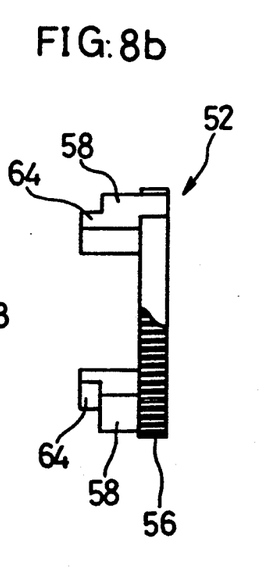
Figure 8C:
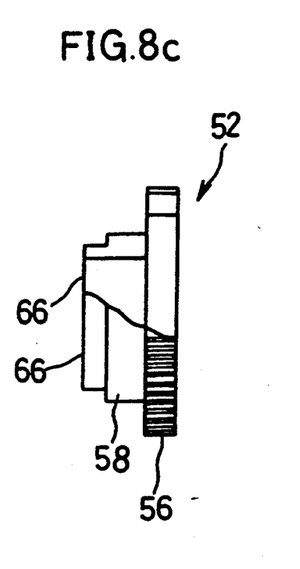

Around the outer wall of the engaging ring 42, a locking ring 52 made of polyamide resin is disposed in a manner relatively movable in the axial direction but unrotatably with respect to the engaging ring 42. The locking ring 52 is urged in the direction to the cylinder member 14 by a spring 54 disposed therearound. As shown in FIGS. 5 and 8, the locking ring 52 comprises an operating knob portion 56 and a pair of arc-shaped locking portions 58 projecting in the axial direction. The operating knob 56 has concaved-convexed portion on the outer wall thereof. The locking portions 58 are formed in a size and at positions so that they are snugly inserted into the indentations formed between the pair of the outwardly-directing portions 44 and the pair of the guide-stopper portions 50 of the engaging ring 42. The locking portions 58 are kept inserted into the indentations between the pair of the guide-stopper portions 50 when the locking ring 52 is fully pressed in the leftward direction in FIG. 1. The locking portions 58 are also kept inserted into the indentations betwen pair of the guide-stopper portions 50 when the locking ring 52 is fully retracted against the urging force of the spring 54 in the rightward direction in FIG. 1. The engaging ring 42 and the locking ring 52 are thus made rotatable integrally by the engagement between the guide-stopper portions 50 and the locking portions 58.

The locking portions 58 are inserted into the indentations, i.e., the locking grooves 68 (shown in FIG. 6), between the inwardly-directing engaging portions 26 of the cylinder member 14 when the locking ring 52 is turned by a predetermined angle together with the engaging groove 42. The end surfaces 60 facing in the peripheral direction are brought into contact with the end surfaces 62 (shown in FIG. 6), facing in the peripheral direction, of the cylinder member 14, thereby preventing the locking ring 52 and the engaging ring 42 from relatively turning with respect to the cylinder member 14.

As detailed in FIG. 5, reduced-diameter portions 64 are formed at the end of the locking portions 58. The reduced-diameter portions 64 are engaged with the inner surface of the periphery wall portion 24 of the cylinder member 14 when the entire locking portions 58 are inserted into the locking grooves 68 (shown in FIG. 6) of the cylinder member 14. The end surfaces 66, facing in the axial direction, of the reduced-diameter portions 58 are got over the end surface, facing in the axial direction, of the cylinder member 14, i.e., the surfaces of the inwardly-directing engaging portions 26, when the locking ring 52 is retracted in the rightward direction and turned by a predetermined angle.

As shown in FIGS. 1, 3, 4 and 6, an opening-closing valve 70 is disposed in the cylinder member 14. The opening-closing valve 70 has a valve body 72, and the valve body 72 is made slidable in the axial direction in the center bore of a valve seat 74 formed on the inner surface of the cylinder member14. The valve body 72 has a flange 76 at the right end thereof in the Figures, and is urged at the flange 76 in the right direction by a spring 79. At the other end of the valve body 72, a stopper block 78 is fixed by a screw 80. As shown in FIG. 6, the stopper block 78 has arc-shaped surfaces 81 and flat cut-off surfaces 82. The arc-shaped surfaces 81 engage slidably with the inner surface of a primary fluid chamber 90 (shown in FIG. 1) defined by the valve seat 74. Clearances 85, i.e, a fluid path, are formed between the cut-off surfaces 82 and the inner surface of the cylinder member 14.

The stopper block 78 is formed in a taper surface 83 at the right end thereof in the Figures. The taper surface 83 is brought into close contact with a taper surface 84 of the valve seat 74 formed correspondingly thereto, thereby closing the fluid path.

The valve body 72 is further provided with a fluid path 86 extending in the axial direction thereof and an opening 88 communicating the fluid path 86 and the primary fluid chamber 90. The position of the opening 88 is determined so that it operates in the following manner: When the valve body 72 is pressed in the leftward direction in the Figures, the opening 88 communicates with the primary fluid chamber 90, and when the pressing force is removed and the valve body 72 is retracted by the spring 79 in the rightward direction in the Figures, the opening 88 communicates with a secondary fluid chamber 92.

Figure 3:
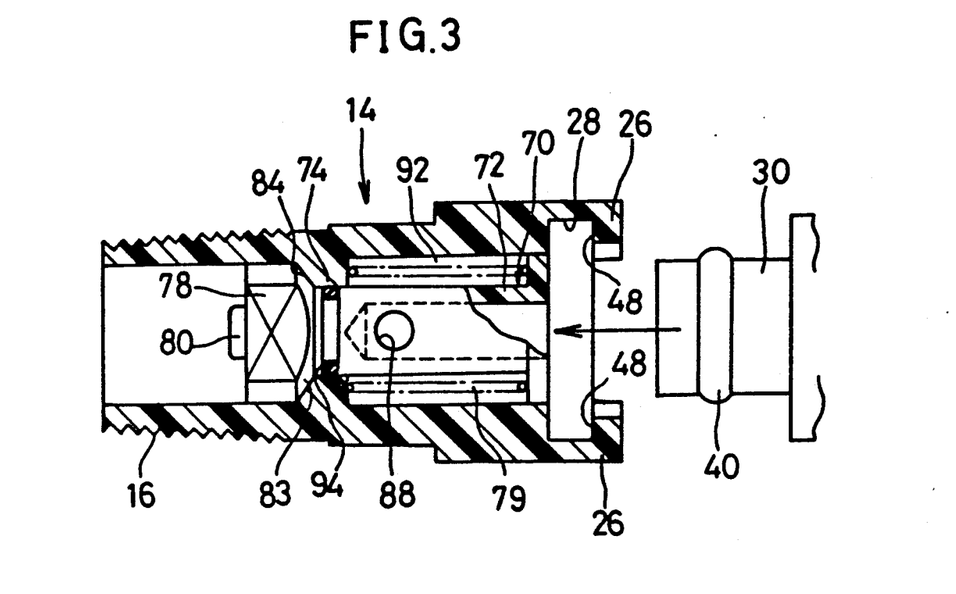
FIG. 3 is a cross-sectional view of an opening-closing valve incorporated in the hose snap-action joint thereof and its periphery portion.
Figure 4:
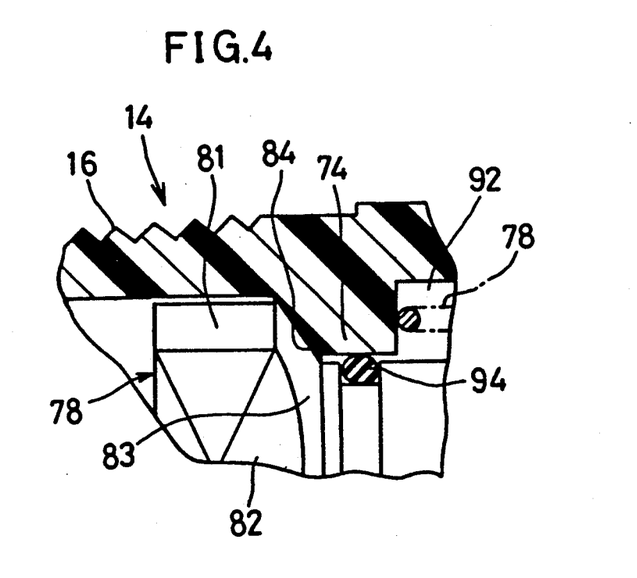
FIG. 4 is an enlarged cross-sectional view of the major portion of FIG. 3.

An O-ring 94 is installed around the valve body 72 at the end thereof in the vicinity of the stopper block 78. The O-ring 94 is brought into close contact with the center bore inner surface 96 of the valve seat 74 in a water-proof manner, thereby closing the fluid path. The fluid path is thus closed twice by the taper surface 83 of the stopper block 78 and the O-ring 94 in this preferred embodiment as shown in FIGS. 3 and 4.

The procedure of connecting the hose 36 with the mating member 18 by using the hose snap-action joint of this preferred embodiment and the operations of the joint component member will be hereinafter described.

As shoiwn in FIG. 6, the valve body 72 with the spring 79 installed around is inserted into the cylinder member 14 from the opening at the increased-diameter end thereof. The stopper block 78 is inserted into the cylinder member 14 from the opening at the reduced-diameter end thereof, and is fixed by the screw 80 at the end of the valve body 72. The opening-closing valve 70 is thus assembled in the cylinder member 14. When assembled, the stopper block 78 is brought into close contact with the valve seat 74 by the urging force of the spring 79, the O-ring 94 is brought into close contact with the center bore inner surface 96 of the valve seat 74, and the opening 88 communicates with the secondary fluid chamber 92 as shown in FIG. 3, but the primary fluid chamber 90 and the secondary fluid chamber 92 are shut off.

Then, the first joint member 10, namely the cylinder member 14 with the opening-closing valve 70 assembled, is connected to the mating member 18 by the threads 16 and 20 while being interposed by a sealing member (not shown). Thus, the mating member 18 is ready for the connection to the hose 36 by way of the cylinder member 14. Thereafter, the second joint member 12 is connected to the cylinder 14. The connecting operation is done as follows.

Figure 2:
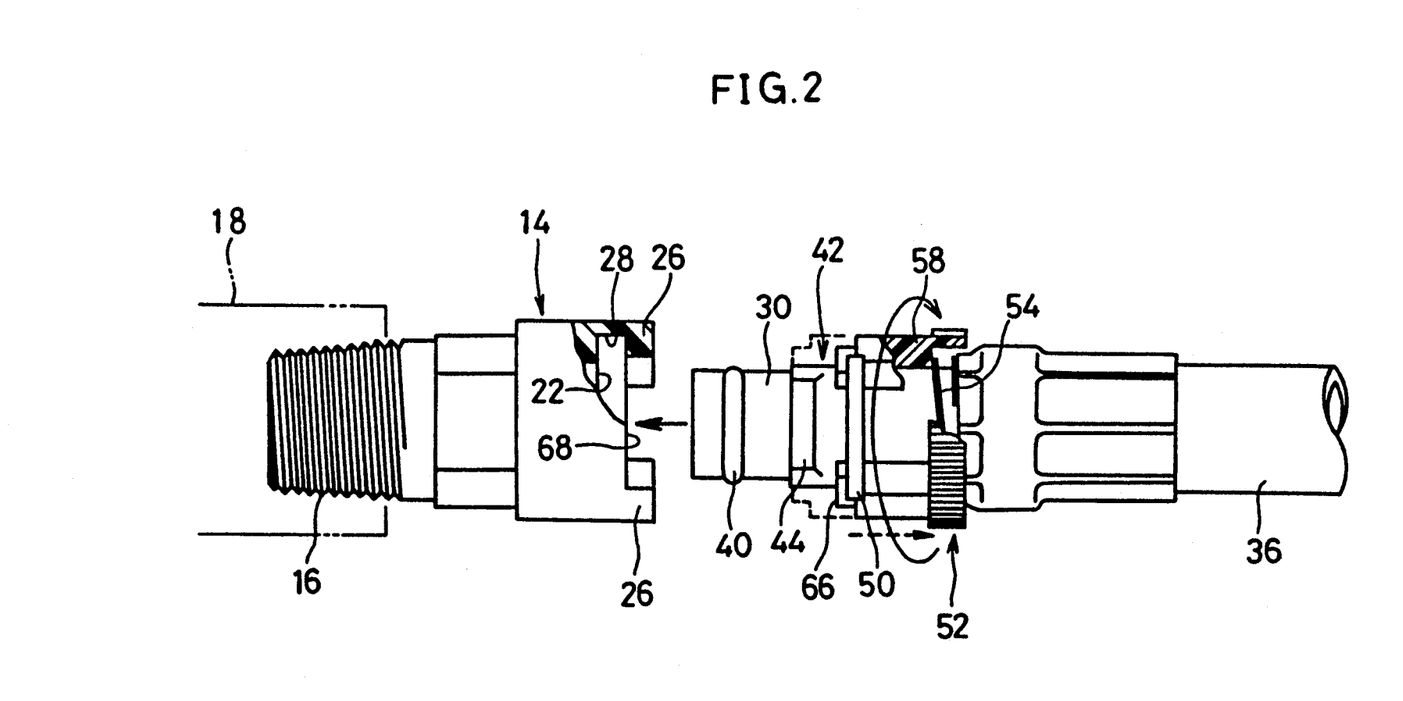
FIG. 2 is a front view, partly in section, of the hose snap-action joint of FIG. 1 disconnected into joint members.
Figure 9A:
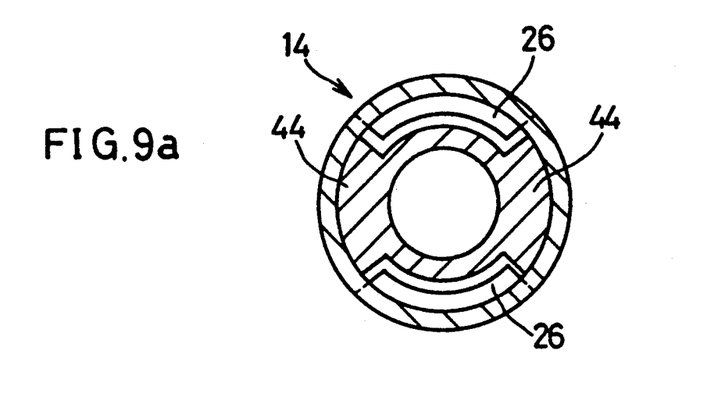

As shown in FIGS. 2 and 9 (A), the angle position of the engaging ring 42 and the locking ring 52 is determined by turning them so that the arc-shaped outwardly-directing engaging portions 44 of the engaging ring 42 face the locking groove 68 the cylinder member 14. At the angle position, the locking ring 52 is retracted in the right direction in FIG. 2 against the urging force of the spring 54, and the insert pipe member 30 is inserted into the cylinder member 14. Then, the locking ring 52 is turned in the clockwise direction by applying force to the operatring knob portion 56.

Figure 9B:
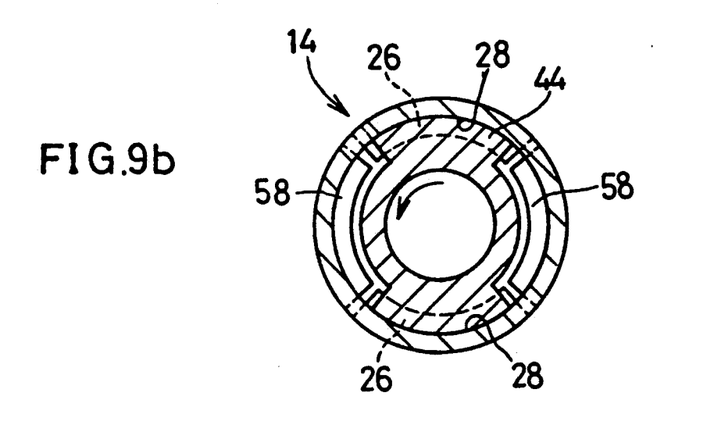
Figure 9C:
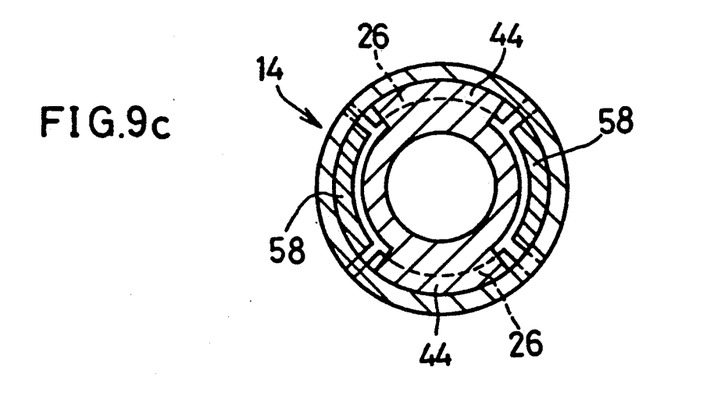

When the locking ring 52 and the engaging ring 42 are turned integrally to a position deviating from the original position by the phase of 90 deg., the outwardly-directing engaging portions 44 of the engaging ring 42 completely get into the arc-shaped grooves 28 of the cylinder member 14 as shown in FIGS. 1 and 9 (B), and engage with the inwardly-directing engaging portions 26 of the cylinder member 14. At the same time, the outwardly-directing engaging portions 44 get on the end surfaces, facing in the axial direction, of the inwardly-directing engaging portions 26 of the cylinder member 14. The locking portions 58 of the locking ring 52 reach at the positions corresponding to the locking grooves 68 of the cylinder member 14 as shown in FIG. 9 (B). Then, the entire locking ring 52 is pressed by the urging force of the spring 54 in the leftward direction in FIG. 1, and the locking portions 58 are engaged with the locking grooves 68 as shown in FIG. 9 (C). Namely, the relative rotation of the locking ring 52 and engaging ring 42 with respect to the cylinder member 14 or vice versa has been thus prohibited by the action of contact between the periphery end surfaces 60 of the locking portions 58 (shown in FIG. 5) and the periphery end surfaces 62 of the locking grooves 68 or the periphery end surfaces 62 of the inwardly-directing engaging portions 26 (shown in FIG. 6). The first joint member 10 and the second joint member 12 have been thus connected undetachably.

When the insert pipe 30 has been inserted, as shown in FIG. 1, the valve body 72 of the opening-closing valve 70 is pressed in the leftward direction by the head 38 of the insert pipe member 30. Whereby the opening 88 having been originally communicating with the secondary fluid chamber 92 comes to communicate with the primary fluid chamber 90. Thus, the primary fluid chamber 90 communicates with the inside of the insert pipe member 30, i.e., the inside of the hose 36, and the fluid in the primary fluid chamber 90 flows into the hose 36.

In the hose snap-action joint of this preferred embodiment, since the engaging ring 42 and the locking ring 52 can rotate relatively with respect to the insert pipe member 30 or the hose 36, the hose 36 cannot be twisted when connecting the first joint member 10 with the second joint member 12 by turning the engaging ring 42 and the locking ring 52. Accordingly, the connecting operation is easy, and the hose 36 is less likely to be damaged during the connecting operation.

The procedure of connecting the first joint member 10 and the second joint member 12 and the operations of the joint component members have been described so far. The disconnection of the first joint member 10 and the second joint member 12 can be done in the order reversing the above-mentioned connecting procedure.

Namely, the locking ring 52 is first retracted in the rightward direction in FIG. 1 to disengage the locking portions 58 from the locking grooves 68. Then, the locking ring 52 together with the engaging ring 42 are turned by 90 deg. in the counterclockwise direction. When the locking ring 52 and the engaging ring 42 have been turned by 90 deg. from the engaging position in the counterclockwise direction, the axial engagement between the inwardly-directing engaging portions 26 and the outwardly-directing engaging portions 44 are disengaged completely. Thus, the insert pipe member 30 can be removed from the cylinder member 14.

When the insert pipe member 30 has been removed, the valve body 72 of the opening-closing valve 70 is retracted in the rightward direction in FIG. 1 by the urging force of the spring 79. The taper surface 83 of the stopper block 78 is brought into close contact with the taper surface 84 of the valve seat 74, and the O-ring 94 is brought into close contact with the center bore inner surface 96 of the valve seat 74. Thus, the primary fluid chamber 90 and the secondary fluid shaft 92 are shut off completely.

One of the preferred embodiments of this invention has been detailed so far, but this invention is not limited thereto and may be realized in other forms. For instance, the locking ring 52 may be disposed around the outer wall of the insert pipe portion 30 in a manner integrally rotatable with the engaging ring 42, contrary to the above-described preferred embodiment in which the locking ring 52 is disposed around the outer wall of the engaging ring 42. The locking grooves 68 may be formed on the locking ring 52, and the locking portions 58 may be formed on the engaging ring 42. Further, this invention is applicable to a swivel joint.

Having now fully described the invention, it will be apparent to one of ordinary skill in the art that many changes and modifications can be made thereto without departing from the spirit or scope of the invention as set forth herein.

What is claimed is:

1. A hose snap-action joint comprising:
    a cylinder member formed in a cylinder shape, disposed integrally with or independently of a mating member to be connected, and comprising an arc-shaped radially inwardly-directing engaging portion disposed on the inner surface thereof and a first locking portion disposed on an end thereof in a manner projecting in the axial direction thereof;
    an insert pipe member, to be fixed at one end of a hose and inserted rotatably into said cylinder member, for communicating said mating member and said hose;
    an engaging member disposed rotatably on the outer surface of said insert pipe having an arc-shaped radially outwardly-directing engaging portion, corresponding to said inwardly-directing engaging portion, and said outwardly-directing engaging portion made engageable with said inwardly-directing engaging portion at a predetermined angle position;
    a locking ring disposed on the outer surface of said insert pipe member in a manner rotatable integrally with said engaging member and relatively movable in the axial direction of said engaging member by a predetermined distance and having a second locking portion disposed on the end thereof in a manner locking with said first locking portion of said engaging member, and a spring means for urging said locking ring toward said cylinder member in the axial direction thereof.

2. A hose snap-action joint according to claim 1, wherein said cylinder member is disposed independently of said mating member;

said engaging member is disposed independently of said insert pipe member;

said locking groove of said locking mechanism is formed on an end surface of said cylinder member;

said locking portion of said locking mechanism is formed on an end surface of said locking ring.

3. A hose snap-action joint according to claim 1, wherein said arc-shaped outwardly-directing engaging portion is formed in a pair disposed at equally spaced intervals; and said arc-shaped inwardly-directing engaging portion is formed in a pair disposed at equally spaced intervals.

4. A hose snap-action joint according to claim 1, wherein said locking ring comprises: an operating knob comprising concaved-convexed portions formed on the outer wall thereof and locking portion engagable with said locking groove.

5. A hose snap-action joint according to claim 4, wherein said locking portion comprises: reduced-diameter portion formed on an end surface of said locking portion, and wherein said reduced-diameter portion is engaged with the inner surface of said cylinder member when said locking portion is inserted into said locking groove, and the axial end surface of said reduced-diameter portion is got over the axial end surface of said inwardly-directing engaging portion when said locking member is retracted against the urging force of said spring means and turned by a predetermined angle.

6. A hose snap-action joint according to claim 1, wherein said engaging member further comprises arc-shaped outwardly-directing guide-stopper portion projecting in the radial direction thereof outwardly and disposed at an interemediate position thereof by a predetermined distance away from said arc-shaped outwardly-directing engaging portion, and said arc-shaped outwardly-directing guide-stopper portion is to be brought into contact with the end surface of said arc-shaped inwardly-directing engaging portion of said cylinder member.

7. A hose snap-action joint according to claim 1 further comprises: an opening-closing valve incorporated in said cylinder member and comprising a head portion, a shaft portion, a fluid path formed in said shaft portion in a manner extending in the axial direction thereof and communicating said mating member with said hose, a flange portion, an O-ring disposed around said shaft portion in the vicinity of said head portion, and a spring means for urging said flange portion in the direction getting away from said mating member, wherein said head portion is seated on a valve seat formed in said cylinder member and said O-ring is brought into contact with a center bore inner surface formed in said cylinder member when said insert pipe member is disconnected from said cylinder member.

8. A hose snap-action joint according to claim 1, wherein said cylinder member, said insert pipe member, said engaging member, and said locking ring are made of polyamide resin.

9. A hose snap-action joint comprising:

a first joint member comprising a cylinder member and a valve body, wherein said cylinder member is disposed independently of a mating member and comprises a pair of arc-shaped inwardly-directing engaging portions projecting in the radial direction thereof inwardly and equally spaced, and a pair of locking grooves formed between said arc-shaped inwardly-directing engaging portions, and said valve body comprising a detachable head, a shaft including an axially extending fluid path formed therein, and communicating said mating member and a hose, a flange, an O-ring disposed around said shaft in the vicinity of said head, and a spring for urging said flange in the direction away from said mating member; and a second joint member comprising an insert pipe member, to be inserted into said hose, for communicating said mating member and said hose, an engaging ring, a locking ring, and a spring for urging said locking ring in the direction toward said cylinder member, wherein said engaging ring is disposed rotatably around said insert pipe member and comprises a pair of equally spaced arc-shaped radially outwardly-directing engaging portions and a pair of equally spaced radially outwardly-directing guide-stopper portions disposed in a manner parallel to said arc-shaped outwardly-directing engaging portions at an intermediate position thereof at a predetermined distance from said arc-shaped outwardly-directing engaging portions, and said locking ring disposed around said engaging ring in a manner rotatable integrally with said engaging ring and movable in the axial direction by a predetermined distance and comprising a pair of arc-shaped locking portions projecting in the axial direction thereof at one end surface thereof;

wherein said inwardly-directing engaging portions of said cylinder member and said outwardly-directing portions are made engageable with each other at a predetermined angle position, said locking grooves of said cylinder member and said locking portions of said locking ring engage with each other when said locking ring is pressed into said cylinder member and said engaging ring and said locking ring are turned by a predetermined angle relative to said cylinder member, thereby engaging the engaging surfaces of said inwardly-directing engaging portions of said cylinder member with the engaging surfaces of said guide-stopper portions of said engaging ring, and engaging the engaging surfaces of said outwardly-directing engaging portions of said engaging ring with the inner surfaces of said cylinder member, whereby said first joint member and said second joint member are connected with each other.

10. A hose snap-action joint according to claim 9, wherein said cylinder member of said first joint member, said insert pipe member of said second joint member, said engaging ring thereof, and said locking ring thereof are made of polyamide resin.

* * * * *